Oct. 26, 1965 E. S. MOYER ETAL 3,213,971
BRAKE ADJUSTER LIMITING DEVICE
Filed Nov. 26, 1963 5 Sheets-Sheet 1
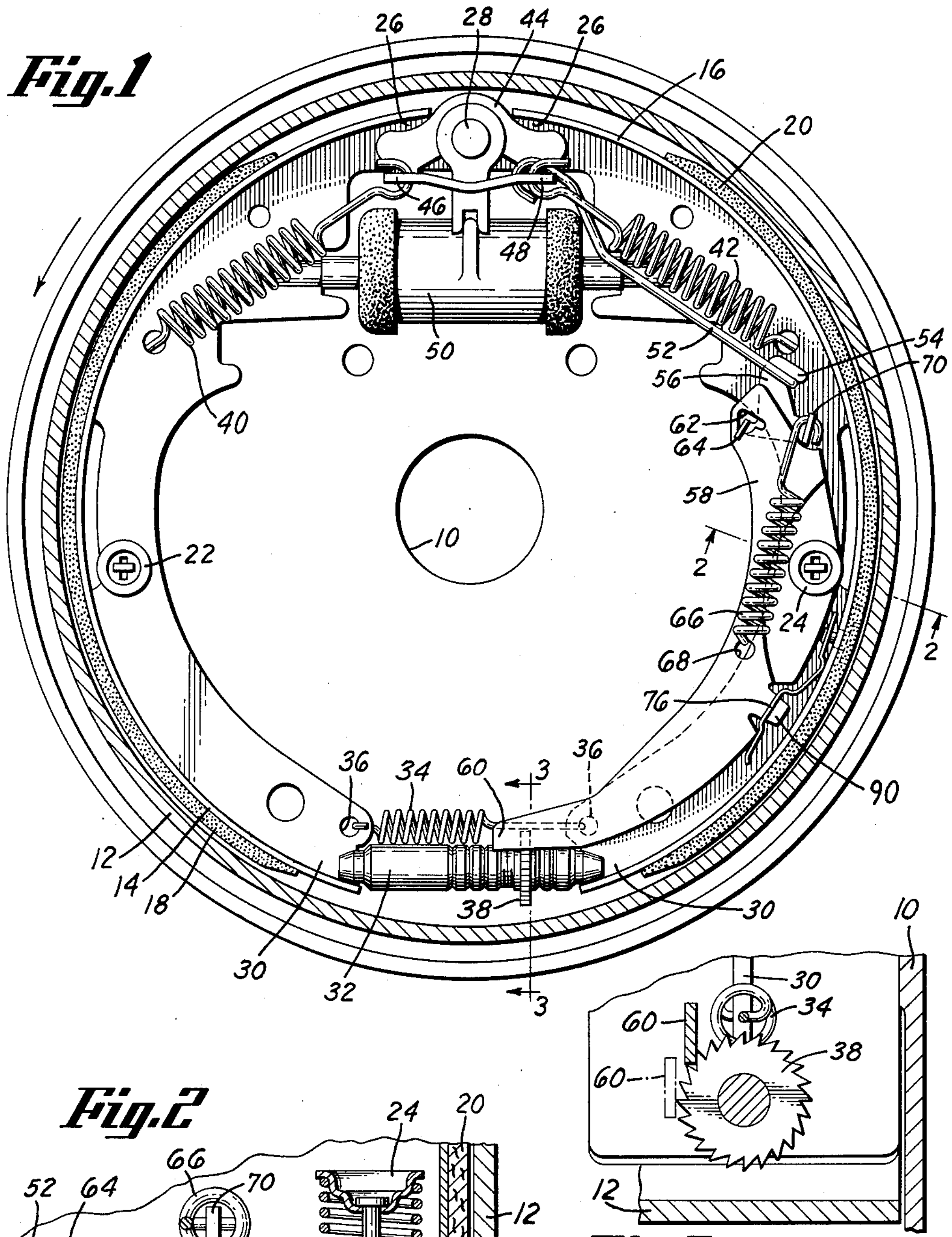
Fig.1, Fig.3
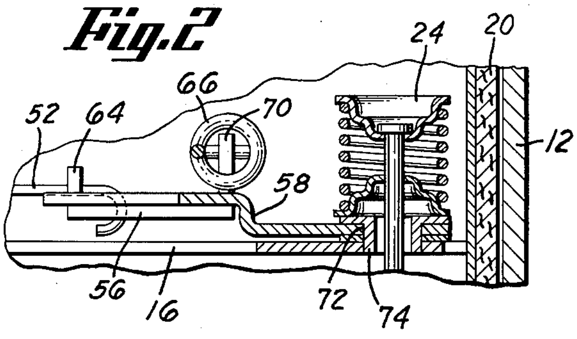
INVENTORS
ELTON S. MOYER
ROBERT H. BAUMAN
BY D. D. McGraw
ATTORNEY Oct. 26, 1965 E. S. MOYER ETAL 3,213,971

BRAKE ADJUSTER LIMITING DEVICE

Filed Nov. 26, 1963 5 Sheets-Sheet 2

INVENTORS
ELTON S. MOYER
ROBERT H. BAUMAN
BY
D. D. McGraw
ATTORNEY

Oct. 26, 1965 E. S. MOYER ETAL 3,213,971

BRAKE ADJUSTER LIMITING DEVICE

Filed Nov. 26, 1963 5 Sheets-Sheet 3

INVENTORS
ELTON S. MOYER
ROBERT H. BAUMAN
BY
D. D. McGraw
ATTORNEY

INVENTORS
ELTON S. MOYER
ROBERT H. BAUMAN
BY
D. D. McGrath
ATTORNEY

BRAKE ADJUSTER LIMITING DEVICE

Filed Nov. 26, 1963 5 Sheets-Sheet 5

INVENTORS
ELTON S. MOYER
ROBERT H. BAUMAN
BY
D. D. McGraw
ATTORNEY

United States Patent Office 3,213,971

Patented Oct. 26, 1965

3,213,971

BRAKE ADJUSTER LIMITING DEVICE

Elton S. Moyer and Robert H. Bauman, Dayton, Ohio, assignors to General Motors Corporation, Detroit, Mich., a corporation of Delaware Filed Nov. 26, 1963, Ser. No. 325,910

10 Claims. (Cl. 188—79.5)

This invention relates to vehicle automatic brake adjusting mechanisms and more particularly to devices working in conjunction with brake adjusting levers to alert vehicle operators to brake wear below a predetermined point.

The present invention constitutes improvements on an automatic brake adjusting mechanism described and claimed in United States Patent No. 3,050,157, issued August 21, 1962, and entitled "Automatic Brake Adjuster."

One of the advantages of a self-adjusting braking system is that the brake pedal within the driver's compartment will always remain at a high level due to the linings being moved progressively in the direction of a brake drum as the thickness of the lining diminishes during repeated brake operations. A disadvantage to this automatic adjusting is that the brake pedal remains in the same position during progressing brake lining wear and, therefore, an operator of the vehicle is never apprised of the fact when brake lining wear becomes dangerously low. If this type of wear is allowed to continue unchecked, the linings will be worn away from the metallic shoe and, eventually, the metallic shoe will come into direct contact with the brake drum. Not only would the braking action in that wheel be drastically affected, but severe damage to the brake drum would result. This invention is meant to obviate this problem in that a consumable metal element reposes in a counterbore in the brake lining at a level which is deemed to be the minimum amount of brake lining which can accomplish a safe braking action. In all the embodiments, this consumable metal head retains a spring element which, when released, prevents further actuation of the automatic adjusting mechanism.

It is an object of the present invention to provide a brake lining wear sensing device.

It is another object of the present invention to provide a device which will disable the automatic adjusting brake mechanism in which it is used after brake lining wear has progressed below a predetermined point.

It is still another object of the present invention to provide a very simple brake adjustment limiting device that can be used on self-adjusting mechanisms of known designs.

It is a further object of the present invention to provide a consumable brake lining wear sensing element that will not affect the operation of the brake during the consumption of the element.

It is still a further object of the present invention to provide a brake lining wear sensing device which disables the automatic brake adjusting mechanism after a predetermined amount of lining wear and which will then alert an operator of a motor vehicle of excessive brake lining wear by means of a steady lowering of the brake pedal in the driver's compartment.

Further objects and advantages of the present invention will be apparent from the following description, reference being had to the accompanying drawings wherein preferred embodiments of the present invention are clearly shown.

In the drawings:

FIGURE 1 is an elevational view of an automatic brake adjuster and brake assembly utilizing the present invention;

FIGURE 2 is a sectional view taken along line 2—2 of FIGURE 1;

FIGURE 3 is a sectional view taken along line 3—3 of FIGURE 1;

Figures 4, 5, 6:
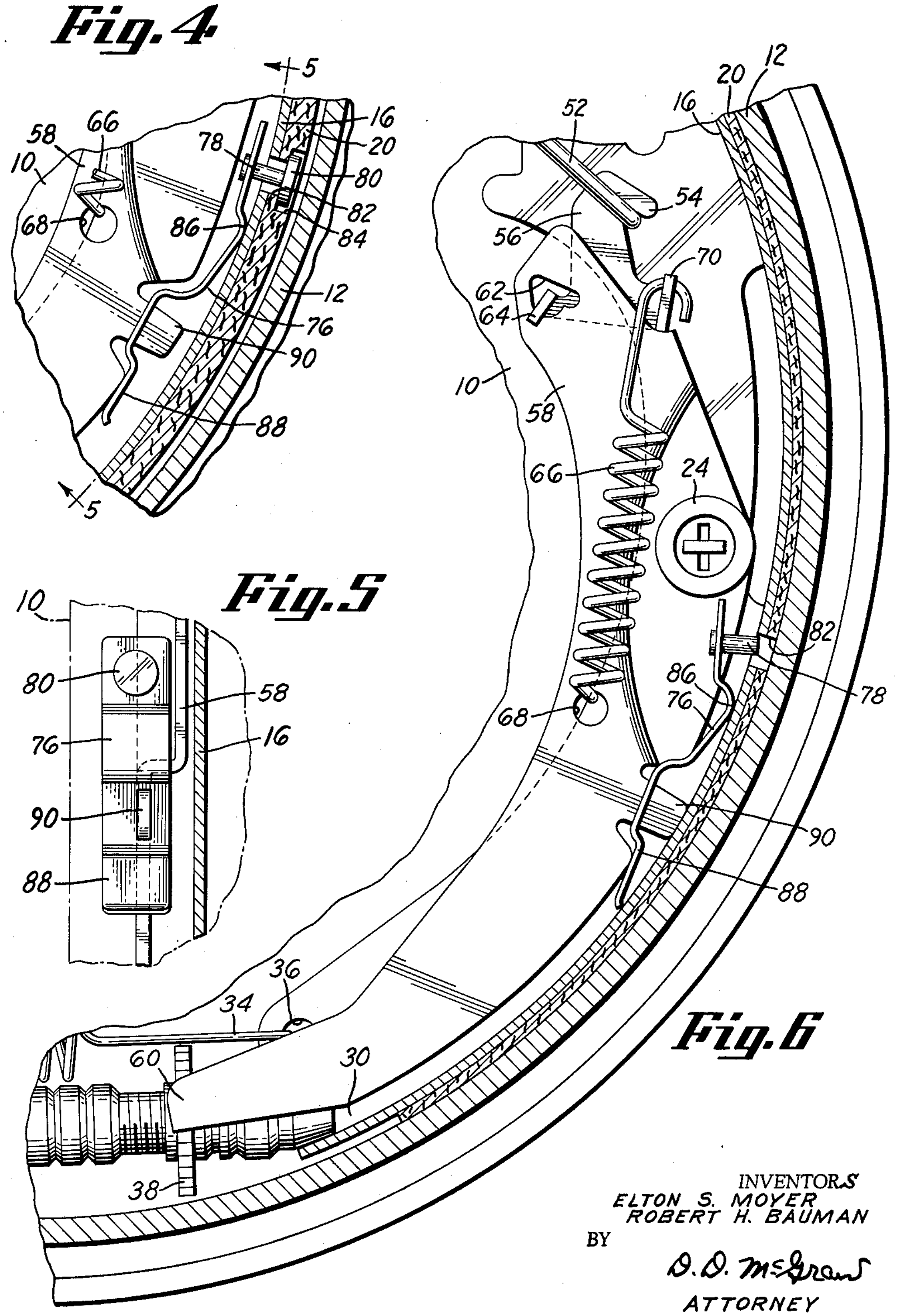
FIGURE 4 is a sectional view of the subject device, shown with parts broken away, illustrating the configuration of the automatic adjusting lever when little or no brake wear has taken place.
FIGURE 5 is a sectional view taken along line 5—5 of FIGURE 4.
FIGURE 6 is a sectional view of the subject device, shown with parts broken away, illustrating the configuration of the automatic adjusting lever when excessive brake wear has taken place.

Referring now to FIGURE 1, the brake used with the present invention has a backing plate 10 that is a stationary member and is secured to an axle housing of a vehicle. A brake drum 12 is carried by a wheel of a vehicle and is adapted to rotate therewith. Brake shoes 14 and 16 carrying linings 18 and 20, respectively, are loosely carried by the backing plate 10 by means of a series of spring fastener assemblies 22 and 24. The brake shoes 14 and 16 have arcuate portions on their first ends 26 adapted to rest against an anchor pin 28. The brake shoes 14 and 16 have slots provided in their second ends 30 and arranged to cooperate with slots in either end of an adjusting screw 32. A spring 34 is arranged to cooperate with apertures 36 in the brake shoes 14 and 16 to maintain a firm engagement between the second ends 30 of the brake shoes 14 and 16 to the adjusting screw 32. The adjusting screw 32 is of common design and has a geared or toothed wheel 38 adapted to cause the adjusting screw 32 to be elongated as the geared wheel 38 is turned in one direction.

The brake shoes 14 and 16 are retained in engagement with the anchor pin 28 by means of retraction springs 40 and 42, respectively, in a conventional manner. A bracket 44 is mounted on the anchor pin 28 and has portions 46 and 48 to which ends of the retraction springs 40 and 42 are attached, thereby retaining the brake shoes 14 and 16 against random axial movement on the anchor pin 28 as well as keeping the arcuate portions of the brake shoes 14 and 16 firmly against the periphery of the anchor pin 28.

An hydraulic wheel cylinder 50 is adapted to drive the brake shoes 14 and 16 into contact with the inside periphery of the brake drum 12 in response to hydraulic pressure from the vehicle braking system, not shown.

The automatic adjusting mechanism includes a link 52 having one end pivotally secured to the portion 48 of the bracket 44 and another end pivotally engaging an ear 54 of a link lever 56. An adjusting lever 58 is pivotally carried by a portion of the spring fastener assembly 24, as seen in FIGURE 2, and has one end 60 adapted to engage the geared wheel 38. The opposite end of the adjusting lever 58 has an aperture 62 in which an upwardly protruding tang 64 of the link lever 56 is pivotally received. A spring 66 has one end engaging an aperture 68 in the adjusting lever 58 and another end engaging an upwardly projecting tang 70 of the link lever 56 to maintain the edge of the adjusting lever 58 in biased engagement with the tang 70.

The pivotal mounting of the adjusting lever 58 is more clearly shown in FIGURE 2 wherein an aperture 72 in the adjusting lever 58 bears against one edge of a bearing 74 carried by the web of the brake shoe 16.

The aforementioned structure is intended to provide an operative environment for the present invention and constitutes no part of this invention other than in cooperative combination.

In normal operation of the described braking system, the drum 12 rotates in the direction of the arrow, shown in FIGURE 1, as the vehicle moves forward. Thus, on an application of the brakes, the wheel cylinder 50 expands the brake shoes 14 and 16 into engagement with the brake drum 12 to effect counterclockwise rotation of the brake shoe assembly with the first end 26 of the brake shoe 16 engaging the anchor pin 28. This is the normal operation of a servo brake mechanism. On reverse motion of the vehicle, the wheel cylinder 50 will again expand the brake shoes 14 and 16 into engagement with the drum 12. But at this time, the brake assembly will rotate in a clockwise direction, as viewed in FIGURE 1, so that the link 52 pulling on the link lever 56 will cause the adjusting lever 58 to rotate about the bearing 72 of the spring fastener assembly 24. This will cause the adjusting lever 58 to move counterclockwise about the assembly 24 as viewed in FIGURE 1 and cause the end 60 of the adjusting lever 58 to engage a tooth of the geared wheel 38, as seen in FIGURE 3, to cause an expansion of the adjusting screw 32. This movement of the adjusting lever 58 will occur whenever the wear of the linings is greater than the peripheral space of the adjacent teeth of the gear on the geared wheel 38. This extension of the adjusting screw 32 serves to drive the brake shoes 14 and 16 closer to the brake drum thereby closing the distance between the two. The relationship of the end 60 of the adjusting lever 58 to the teeth of the geared wheel 38 is clearly illustrated in FIGURE 3. After each counterclockwise motion of the adjusting lever 58, a return device, usually a resilient means engaging the adjusting lever 58 at tab 90, is employed. Therefore, the motion of the end 60 of the adjusting lever 58 is of the ratcheting type in its movement in a clockwise fashion around the geared wheel 38. It is thus seen that the lever 58 must be returned to a poised position before a second adjusting movement of the lever 58 is possible. The modifications of the present invention hereinafter described serve generally to prevent this return motion of the adjusting lever 58.

Referring now to FIGURE 4 wherein one modification of the present invention is illustrated, a flat spring strip 76 carries a pin 78 having a consumable plug 80 thereon. The pin 78 passes through an aperture 82 in the brake shoe and the consumable plug 80 is received in an aperture 84 of greater dimension than the aperture 82 thereby retaining the consumable plug 80. The spring strip 76 is fulcrumed on the brake shoe rim at point 86 by the retained consumable plug 80 and serves to bias the adjusting lever 58 away from the brake shoe rim by the engagement of an extension 88 of the spring strip 76 and the flange 90 of the adjusting lever 58.

Therefore, as long as the consumable plug 80 retains the spring strip 76 in a tensed position, the extension 88 serves to bias the adjusting lever 58 away from the web of brake shoe 16, thereby providing the adjusting lever 58 with a return means. However, after frequent brake operations, the consumable plug 80 will be worn down concurrently with lining wear until the pin 78 is free to move through the aperture 82. As the pin 78 moves through the aperture 82 under the tensed force of spring 76, the biasing effect on the adjusting lever 58 of the spring extension 88 is lost and, after the next adjusting motion of the adjusting lever 58, no effective return means will exist. Thereafter, no further adjustment of the brake shoes will be accomplished and a progressively lower brake pedal will result in the operator's compartment. The configuration of the adjusting lever 58 relative to the brake drum during this condition of operation is illustrated in FIGURE 6. This progressively lower pedal will alert the operator of the vehicle to the fact that no brake shoe adjustments are taking place within the wheels and an inspection at that time will reveal lining wear of such an amount as to require lining replacement.

Figure 7:
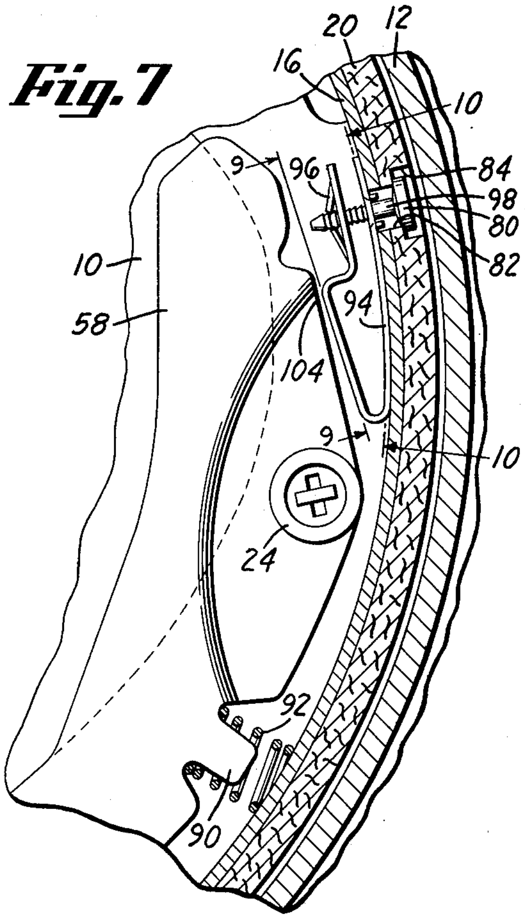
FIGURE 7 shows a second modification of the subject device, shown with parts broken away, illustrating the configuration of the automatic adjusting lever when little or no brake wear has taken place.
Figure 8:
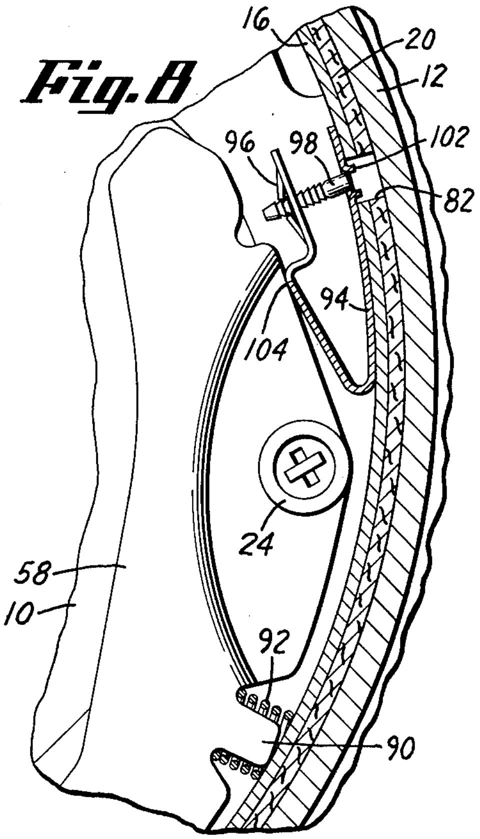
FIGURE 8 shows the second modification of the subject device with parts broken away and illustrates the configuration of the automatic adjusting lever when excessive brake wear has taken place.
Figure 9:
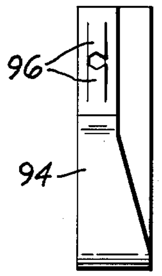
FIGURE 9 is an elevational view taken along line 9—9 of FIGURE 7.
Figure 11:
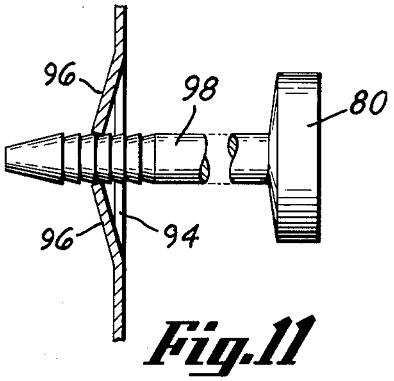
FIGURE 11 is an elevational view of the consumable plug, the holding spring being shown in section.

Referring to FIGURE 7, another modification of the present invention is shown wherein an adjusting lever return spring 92 is disposed in engagement with lever 58 at the tab 90 to bias the adjusting lever 58 in a clockwise manner around its pivotal mounting on the bearing 74 of spring fastener assembly 24. In this modification, a folded resilient spring 94 is biased towards an unfolded configuration but is retained in a folded position by the engagement of a struckout flange 96 of the resilient spring 94 cooperating with a serrated pin 98. The consumable plug 80 is carried by the pin 98 and holds the pin toward the brake shoe 16. The consumable plug 80 rests in the counterbored portion 84 of the brake lining in much the same manner as in the first modification. The relationship of the pin 98 with the flange 96 is more clearly shown in FIGURE 11.

Figure 10:
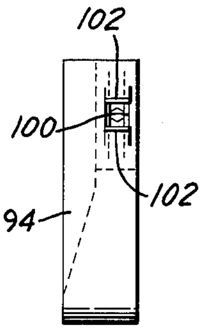
FIGURE 10 is an elevational view taken along line 10—10 of FIGURE 7.

Referring to FIGURE 10, an aperture 100 has a struckout lip 102 arranged to cooperate with the sides of the aperture 82 to positively locate the resilient spring 94.

In this modification, as the consumable plug 80 is worn off during the brake lining wear to a depth corresponding with the base of the counterbore 84, the pin 98 is released and the folded portion of the resilient spring 94 unfolds so that it comes into contact with the adjusting lever 58 at point 104 and urges the adjusting lever 58 in a counterclockwise direction around the bearing 74. The resilient spring 94 has greater tensile strength than the adjusting lever return spring 92 and, consequently, the adjusting lever 58 is driven counterclockwise until the tab 90 comes into contact with the inside surface of the brake shoe 16. In this position, as previously described, the adjusting lever 58 is disabled from further adjusting movement against the geared wheel 38. Without further adjustment, as previously stated, the brake pedal in the operator's compartment of the vehicle will become progressively lower, thereby alerting the operator to the fact that the brake lining should be replaced due to wear.

Figure 12:
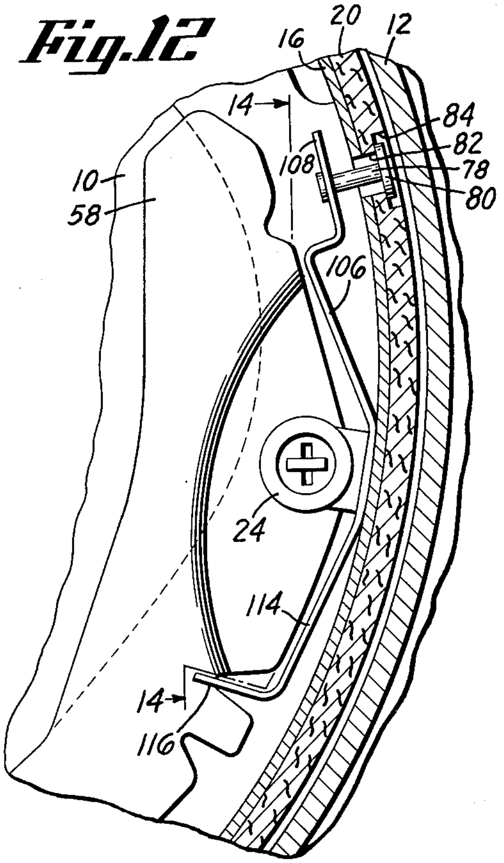
FIGURE 12 shows a third modification of the subject device with parts broken away and illustrates the configuration of the automatic adjusting lever when little or no brake wear has taken place.

Referring now to FIGURE 12, another modification of the subject device is illustrated. A resilient metal strip 106 is pivotally mounted on the bearing 74 and has an end 108 carrying a pin 78 with a flat disk-shaped consumable plug head 80 disposed in the counterbored aperture 84.

Figure 14:
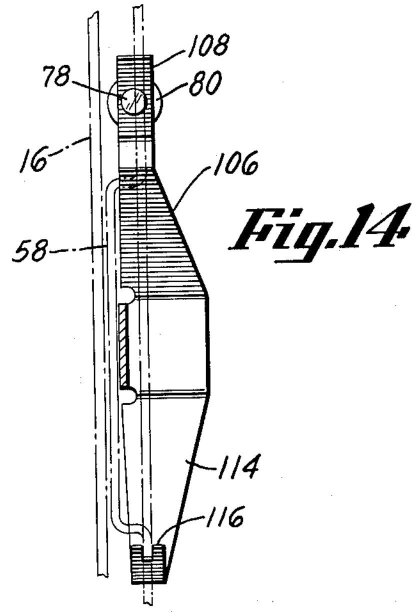
FIGURE 14 is an elevational view taken along line 14—14 of FIGURE 12.

The end 108 of the resilient metal strip 106 is biased in the direction of the adjusting lever 58 but is held in the position as shown in FIGURE 12 by the head 80 as retained in the counterbore. An opposite end 114 of the strip 106 has an upturned flange 116 arranged to cooperate with the adjusting lever 58 to provide a return means for the adjusting lever 58 after an adjusting movement as seen in FIGURE 14.

Figure 13:
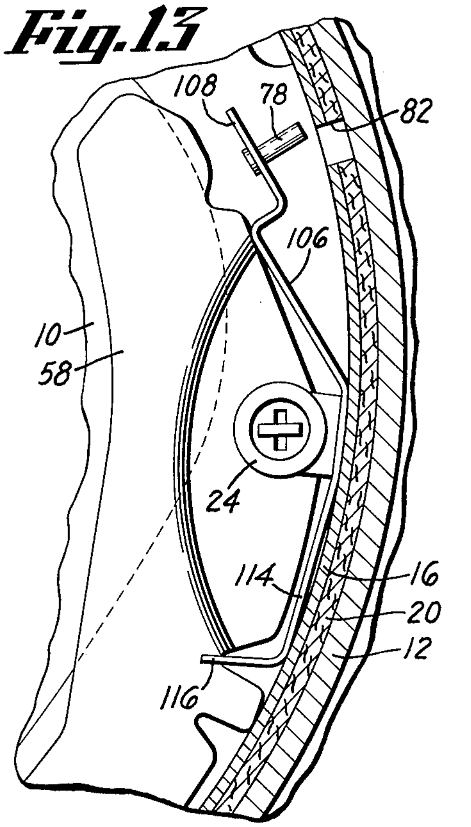
FIGURE 13 shows the third modification of the subject device with parts broken away and illustrates the configuration of the automatic adjusting lever when excessive brake wear has taken place.

In operation, the end 114 of the resilient strip 106 serves to bias the adjusting lever 58 in a clockwise direction around its pivotal mounting on the spring fastener 24 as long as the head 80 is retained in the counterbored aperture 84. As wear of the lining 20 progresses to a point where the head 80 is completely worn away, the end 108 of the strip 106 will move in the direction of the adjusting lever 58 and bias the lever 58 in a counterclockwise direction around its pivotal mounting on the bearing 74. Therefore, after the head 80 has worn away, the adjusting lever 58 will make one more adjusting movement of the geared wheel 38 in the manner as previously described but thereafter will not be allowed to return due to the holding tension of the end 108 over the end 114. In much the same manner as in the previous embodiments, the adjusting lever 58 will be unable to further adjust the brake shoes and the brake pedal in the driver's compartment will become progressively lower, thereby alerting the operator of the vehicle that the brake lining wear has progressed below the predetermined point established by the base of the counterbore. FIGURE 13 illustrates the configuration of the resilient strip 106 and the adjusting lever 58 after the head 80 has been worn away.

Figures 15, 16:
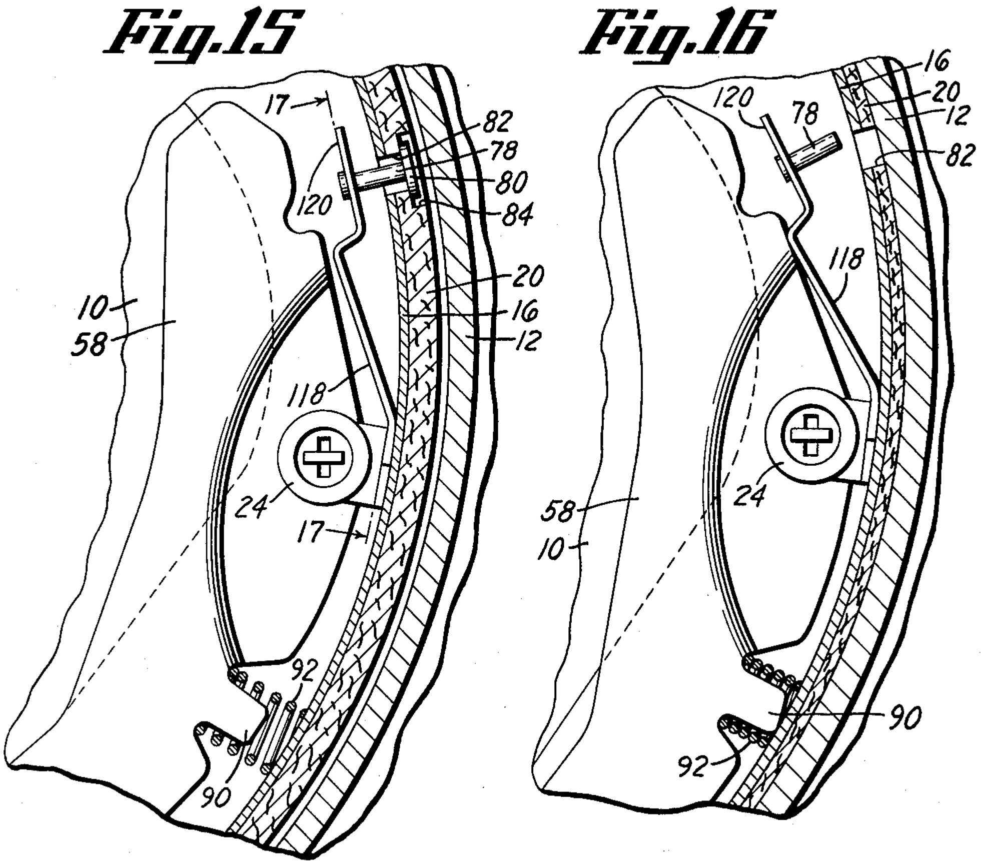
FIGURE 15 shows a fourth modification of the subject device with parts broken away and illustrates the configuration of the automatic adjusting lever when little or no brake wear has taken place.
FIGURE 16 shows the fourth modification of the subject device with parts broken away and illustrates the configuration of the automatic adjusting lever when excessive brake wear has taken place.
Figure 17:
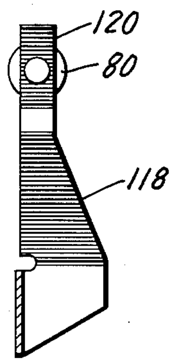
FIGURE 17 is an elevational view taken along line 17—17 of FIGURE 15.

Still another embodiment of the present invention is illustrated in FIGURE 15 wherein the resilient strip 118 is mounted in much the same way as is strip 106, described in the previous embodiment, but wherein the end 114 and the flange 116 of strip 106 are omitted and replaced by the return spring 92.

In operation, the end 120 of the resilient strip 118 is biased in the direction of the adjusting lever 58 but is retained away from the lever 58 by the cooperation of the soft metal head 80 in the counterbore or aperture 84 in the lining 20. As previously stated, the automatic adjusting of the brake lining is accomplished by the movement of the adjusting lever 58 in a clockwise fashion around its pivotal mounting on the bearing 74. After the adjusting lever 58 drives the geared wheel 38 in an adjusting movement, it is returned to its poised position by the return spring 92 which causes a ratcheting action as the end 60 of the adjusting lever 58 slides back over the teeth of the geared wheel 38. This return motion of the adjusting lever 58 on the teeth of the geared wheel 38 is necessary for any further actuation of the adjusting mechanism.

Referring now to FIGURE 16, the end 120 of the resilient strip 118 stores greater force in its tensed position than the return spring 92 stores. Therefore, when the soft metal head 80 is worn completely away during the progressive wear of the brake lining 20, the released end 120 will drive the adjusting lever 58 in a clockwise direction around its pivotal mounting on the bearing 74, thereby preventing the return ratcheting movement of the end 60 of the adjusting lever 58 around the geared wheel 38 in substantially the same manner as previously described. The disabling of the adjusting lever 58 will result in a progressively lower brake pedal inside the operator's compartment of the vehicle as brake lining wear progresses further, and this lowering pedal will alert the operator to the fact that brake lining wear has progressed below a predetermined point.

While the embodiments of the present invention as herein disclosed, constitute preferred forms, it is to be understood that other forms might be adopted.

What is claimed is as follows:

1. In a vehicle, a brake lining wear sensing device comprising; lever means for adjusting the brake lining as wear progresses, resilient means pivotally supported on a brake shoe and normally held under tension away from a brake lining, holding means carried by said resilient means and having a retaining portion extending partially through the brake lining, said holding means including a consumable means for retaining said resilient means under tension until said retaining portion is worn a predetermined amount concurrently with wear of the brake lining thereby releasing said tensed resilient means and disabling the lever means thereby preventing further brake adjustment, the lack of further brake adjustment warning the driver of said motor vehicle of a wear of the brake lining below a predetermined safe level.

2. A device for sensing the wear of brake linings on a vehicle self-adjusting braking system, said device comprising; resilient means supported on a brake shoe being held in a tensed disposition toward a portion of the self-adjusting braking system, and consumable means carried by said resilient means and arranged to initially hold said resilient means and adapted to later release said tensed resilient means in response to brake lining wear below a predetermined point, said poised resilient means being released toward the self-adjusting portion of the vehicle braking system to render the self-adjusting portion inoperable to further adjust the braking system after the predetermined amount of brake lining wear has occurred, the absence of further adjustment causing a lower brake pedal to alert a vehicle operator of brake wear below the predetermined level.

3. A device for limiting the adjusting movement of a self-adjusting mechanism for a vehicle braking system, said mechanism including a pivotable lever engaging an adjusting screw, said device comprising; a resilient element carried by the self-adjusting mechanism and arranged to return the pivotable lever to a poised position after an actuation thereof, and a retaining pin carried by said resilient element and having a portion disposed at least partially through a brake lining for the braking system, said portion being arranged to wear with the brake lining to a predetermined point, further wear of said brake lining causing said holding portion to be worn away completely thereby releasing said resilient element and disabling the return capabilities of said resilient element, said resilient element thereafter being unable to pivot the lever to a poised position after said lever has operatively engaged the adjusting screw thereby causing the vehicle braking system to go out of adjustment.

4. A device for limiting the adjusting movement of a self-adjusting mechanism for a braking system having a lever therefor, said device comprising; a resilient element pivotally supported by the lever and including a fulcrumed portion for returning said lever to a poised position after an actuation thereof, and holding means carried by a portion of said resilient element in flexed disposition around the fulcrum portion, said holding means composed of soft metal material and being disposed in a retaining fashion at least partially through a brake lining for said braking system, said soft metal holding means being adapted to wear with the brake lining to a predetermined point, further wear past this point releasing said flexed resilient element thereby allowing said resilient element to pivot about the fulcrumed portion to disable the return capabilities of the resilient element relative to the adjusting lever, said adjusting lever remaining in a non-poised position thereafter and being incapable of further adjustment in said non-poised position.

5. A device for limiting the adjustment of a self-adjusting braking system having a lever therefor, said device comprising; a resilient member disposed between said adjusting lever and a brake shoe having a brake lining thereon, said resilient member being fulcrumed on the brake shoe and being poised in a tensed position away from the brake shoe, and retaining means engaging said resilient member for holding said resilient member in a tensed position and having a portion passing completely through the brake shoe and partially through the brake lining thereon and being held in a depression therein, said portion being adapted to wear with the brake lining to a predetermined point, whereby said resilient member is released from tension disengaging said portion from the brake lining, said resilient member expanding from tension and driving the lever in a pivotal manner away from the brake shoe thereby preventing any further adjusting movement of the lever.

6. A device for limiting the adjustment of a self-adjusting braking system having an adjusting lever, said device comprising; a resilient member disposed under tension between a portion of the adjusting lever and a brake shoe, the lever being pivotally mounted on a brake shoe, a return spring disposed on one side of the pivotal mounting to urge said lever on its pivotal mounting into a poised position after an adjusting movement has taken place, and holding means keeping said resilient member under tension by drawing a portion of said resilient member toward the brake shoe, said holding means having a consumable end portion embedded in the brake lining and adapted to wear therewith, wear of the brake lining past the depth at which the consumable end portion is held resulting in a release of said holding portion thereby driving said resilient member against one portion of the adjusting lever on the opposite side of the pivotal mounting from the return spring, said resilient member being of sufficient tensile strength to overcome the return capabilities of said return spring thereby disabling the adjusting lever from further adjusting the brake system.

7. A device for limiting the adjusting movement of a self-adjusting brake mechanism having a lever therefor, said self-adjusting mechanism including a compressible spring adapted to return the lever to a poised position after an adjusting movement thereof, said device comprising; a resilient element mounted for pivotal movement on a brake shoe, and compressed against the adjusting lever, said resilient element having a compressed force greater than the compressed force of the return spring, holding means carried by said resilient member and extending through an aperture in the brake shoe, the holding means including a head portion mounted a predetermined distance below the friction surface of a brake lining, said holding means maintaining said resilient member away from said lever under tension, said lever being returned to a poised position after each adjusting movement by a return spring, said resilient member adapted to be released by said holding means in response to a predetermined amount of brake wear as a portion of the holding means is frictionally consumed with the brake lining whereby the resilient member overcomes the force of the lever return spring and keeps the lever in an inoperative position.

8. A device for limiting the adjusting movement of a self-adjusting brake mechanism having a lever therefor, said device comprising; a resilient element pivotally mounted on a brake shoe and adapted to engage one portion of the lever, the lever being pivotally mounted at the same point as said resilient element and arranged to be pivoted in one direction in response to a return spring, and a holding pin including an enlarged head adapted to be consumed in braking action, said holding means keeping said resilient element under tension away from said lever, said enlarged head being disposed at a predetermined level in a brake lining and adapted to be dissolved under friction during braking action thereby releasing said tensed resilient element, said released resilient element being arranged to overcome the return spring pressure after an adjusting movement of the lever to render the adjusting mechanism thereafter inoperative.

9. A device for limiting the adjusting movement of a self-adjusting brake mechanism having a lever therefor, said device comprising; a resilient member pivotally mounted on a brake shoe, the lever for the self-adjusting mechanism being pivotally mounted on the brake shoe at the same point as the resilient member, said resilient member having two portions extending in opposite directions from said pivotal mounting, a first of said portions arranged to return the lever to a poised position after each adjusting movement, a second of said portions retained under tension by a consumable plug arranged to wear with the brake linings and being adapted to engage a portion on the opposite side of said pivotal mounting to disable the lever from any further adjusting movement, said second portion being energized in response to brake lining wear below a predetermined level.

10. A device for limiting the adjusting movement of a self-adjusting brake mechanism having an adjusting lever therefor, said device comprising; a resilient member having first and second portions and being adapted for pivotal movement around a pivot point, a soft metal holding element being carried by the first portion of said resilient member and extending through an aperture in the brake drum, said extending portion having a consumable head larger in diameter than the aperture in the brake drum and being retained at a predetermined level in a brake lining carried on said brake drum, said second portion of the resilient member engaging the lever on one side of the pivotal mounting and being adapted to return said lever to a poised position after each actuation thereof, the resilient member having a portion adapted to engage a second side of the lever on an opposite side of the pivotal mounting in response to a predetermined amount of brake lining wear, said released first portion of the resilient member urging the lever into an over-actuated position thereby preventing any further adjusting movement thereof.

References Cited by the Examiner

UNITED STATES PATENTS 3,017,962 1/62 Ingres ---------------- 188—79.5

ARTHUR L. LA POINT, *Primary Examiner.*

DUANE A. REGER, *Examiner.*